(12) United States Patent
Mainini et al.

(10) Patent No.: US 10,905,101 B2
(45) Date of Patent: Feb. 2, 2021

(54) PET HYDRO WASHER

(71) Applicant: RADIO SYSTEMS CORPORATION, Knoxville, TN (US)

(72) Inventors: Christopher E. Mainini, Knoxville, TN (US); William S. Groh, Knoxville, TN (US); Richard A. Seltzer, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 218 days.

(21) Appl. No.: 15/782,950

(22) Filed: Oct. 13, 2017

(65) Prior Publication Data

US 2018/0103611 A1    Apr. 19, 2018

Related U.S. Application Data

(60) Provisional application No. 62/407,577, filed on Oct. 13, 2016.

(51) Int. Cl.
*A01K 13/00* (2006.01)
*A47L 9/28* (2006.01)
*A47L 7/00* (2006.01)

(52) U.S. Cl.
CPC .......... *A01K 13/001* (2013.01); *A47L 9/2842* (2013.01); *A47L 7/0023* (2013.01)

(58) Field of Classification Search
CPC .. A01K 13/001; A01K 13/003; A01K 27/007; A61D 11/00; A47L 7/0023; A47L 9/2842; A47L 9/2857; A47L 11/4088; A47L 11/408; A47L 11/4083; A47L 11/4013; A47L 11/4016

USPC ....... 119/651, 652, 650, 664, 665, 668, 671, 119/678, 600, 601, 602, 603, 604, 608, 119/609, 611, 612, 613, 614; 15/320, 15/321

See application file for complete search history.

(56) References Cited

U.S. PATENT DOCUMENTS

| | | | |
|---|---|---|---|
| 5,799,362 A * | 9/1998 | Huffman | A47L 1/08 15/321 |
| 7,073,226 B1 * | 7/2006 | Lenkiewicz | A47L 11/34 15/320 |
| 7,228,589 B2 * | 6/2007 | Miner | A47L 11/34 15/320 |

(Continued)

*Primary Examiner* — Trinh T Nguyen
(74) *Attorney, Agent, or Firm* — Baker, Donelson, Bearman, Caldwell & Berkowitz PC

(57) ABSTRACT

A pet hydro washer is described comprising a central housing containing a motor and an air inflow impeller, a fluid delivery system having a clean liquid storage tank, and a water delivery line in fluid communication with the clean liquid storage tank terminating at a nozzle, a fluid recovery system having a liquid recovery tank in fluid communication with the air inflow impeller through a first air conduit, and a suction hose in fluid communication with the liquid recovery tank, the motor configured to generate rotational movement in the air inflow impeller, a processor configured to control delivery of power to the motor, the controlling delivery of power including incrementally changing a level of power delivered to the motor, and at least one attachment head configured to wash an animal's fur through movement of at least one attachment head across the animal's fur while the air inflow impeller is operating.

25 Claims, 11 Drawing Sheets

(56) References Cited

U.S. PATENT DOCUMENTS

| | | | |
|---|---|---|---|
| 7,234,197 B2 * | 6/2007 | Tran ..................... | A47L 11/34 15/320 |
| 8,549,697 B1 * | 10/2013 | Moyher, Jr. ........ | A47L 11/4044 15/320 |
| 9,220,237 B1 * | 12/2015 | Dryden ................ | A47L 9/0081 |
| 2008/0216278 A1 * | 9/2008 | Krebs .................. | A47L 7/0038 15/320 |
| 2013/0318741 A1 * | 12/2013 | Moyher, Jr. ......... | A47L 9/0045 15/327.1 |
| 2015/0245757 A1 * | 9/2015 | Wall .................... | A47L 11/307 15/321 |
| 2016/0135428 A1 * | 5/2016 | Nicholson ........... | A01K 13/003 119/604 |
| 2017/0049076 A1 * | 2/2017 | Takla .................. | A46B 9/023 |
| 2018/0110201 A1 * | 4/2018 | Mohyer, Jr. ......... | A01K 13/001 |
| 2018/0139928 A1 * | 5/2018 | Takla .................. | A01K 13/001 |

* cited by examiner

PET HYDRO WASHER

CROSS REFERENCE TO RELATED APPLICATIONS

This application claims the benefit of U.S. Patent Application No. 62/407,577, filed Oct. 13, 2016.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present inventive concept relates to the field of pet washing devices. More particularly, the invention relates to a portable pet washing device which utilizes water to cleanse the pet's fur. Furthermore, the invention relates to a device for incrementally increasing the motor speed of an electronic device, such as a vacuum or a dryer, to acclimate a pet to noise associated with operation of the electronic device.

Technology in the Field of the Invention

Pets, such as a dogs and cats, have been living with their owners for centuries. An obvious problem with many pets is that they may become muddy or dirty from being outside. Pets may also emit an unpleasant odor from not being clean. As such, many pet owners regularly or occasionally wash the pet to eliminate the dirt or odor.

Conventionally, pet owners wash a dog by simply placing the dog in a bath filled with water, or with a combination of soap and water. The water is poured over the dog's coat and manually scrubbed with soap until it is believed that the coat is clean. A problem associated with such baths is the tendency for a dog to shake off the water during or after the bath. Such shaking off causes water and loose hair to be thrown about the dog's location. The task of bathing is much more difficult in dealing with cats, as cats have a fierce and innate fear of water, causing the cat to try and escape by biting or scratching the pet owner. Additionally, both dogs and cats get anxious about baths, causing them stress and anxiety.

Another approach used by pet owners has been through the use of dry powders or cologne sprays. While these dry powders may mask the odor, or perhaps reduce the odor, they do not remove dirt or mud from the pet's fur. As such, these dry powders and fragrances are not a solution to washing a truly dirty pet. Furthermore, powders usually end up quickly falling off the pet, thereby causing the powder to be spread across not only the location upon which it is applied to the pet, but in all subsequent locations the pet may travel. An additional approach includes bathing a pet outdoors with a garden hose where problems include the potential for not ideal temperatures and the pet may be hard to restrain or confine while outdoors.

Because of the difficulties involved in washing pets through these conventional methods, many pet owners simply take their pet to a pet salon which specializes in washing and grooming pets. However, this solution is time consuming, as the pet owner must transport the pet to another location. Some salons are also expensive. Also, sometimes a "full" bath is not needed; however, a simple solution does not exist for washing specific areas such as paws or legs.

A need therefore exists for an improved pet washer which enables a pet owner to effectively wash the animal without causing anxiety to the pet. Further, a need exists to enable the pet to be washed without the problems associated with placing the animal into a pool of water or using messy dry powders. Still further, a need exists for a pet washer that is portable, and that may be easily stored after use.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

DESCRIPTION OF SELECTED SPECIFIC EMBODIMENTS

Figure 1:
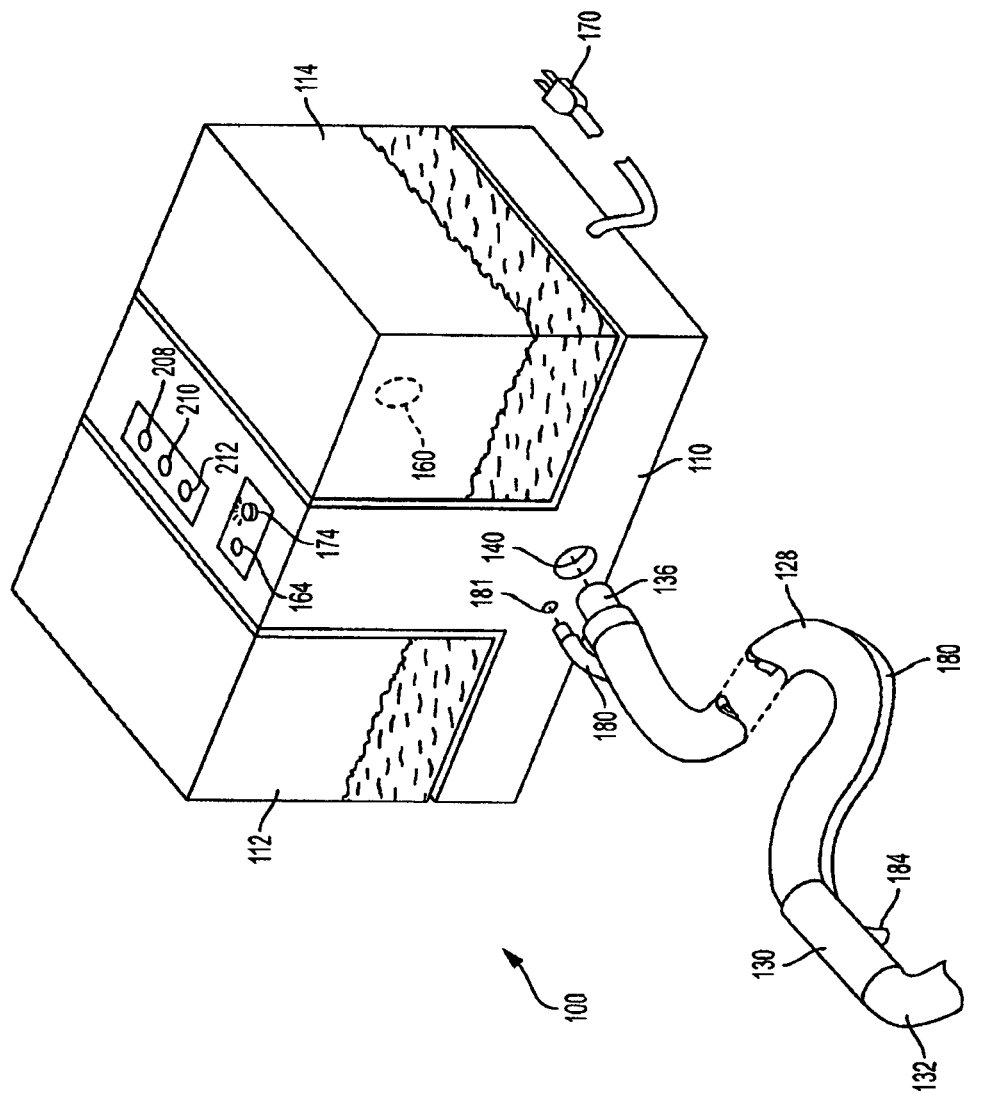
FIG. 1 is a perspective view of a pet hydro washer of the present invention, in one commercialized embodiment.

FIG. 1 is a perspective view of a portable pet hydro washer 100 of the present invention, in one embodiment. The view shows a central housing 110, a removably mounted clean water (or liquid) storage tank (or canister) 112 and a removably mounted dirty water (or liquid) recovery storage tank (or canister) 114. The storage tanks 112 and 114 may be made of a clear plastic material to enable a person to view the quantity of liquid remaining in the clean water storage tank 112 and the amount of dirty fluid collected within the dirty water storage tank 114.

The tanks 112 and 114 are provided with conventionally known removable caps and/or check valves to prevent the flow of liquids from the tanks 112, 114 when they are detached from the central housing 110 for filling or for emptying. Such an embodiment is described in detail in U.S. Patent Application Publ. No. 2013/0318741 entitled "SURFACE CLEANING APPARATUS", the entirety of which is incorporated herein by reference in its entirety.

Figure 2:
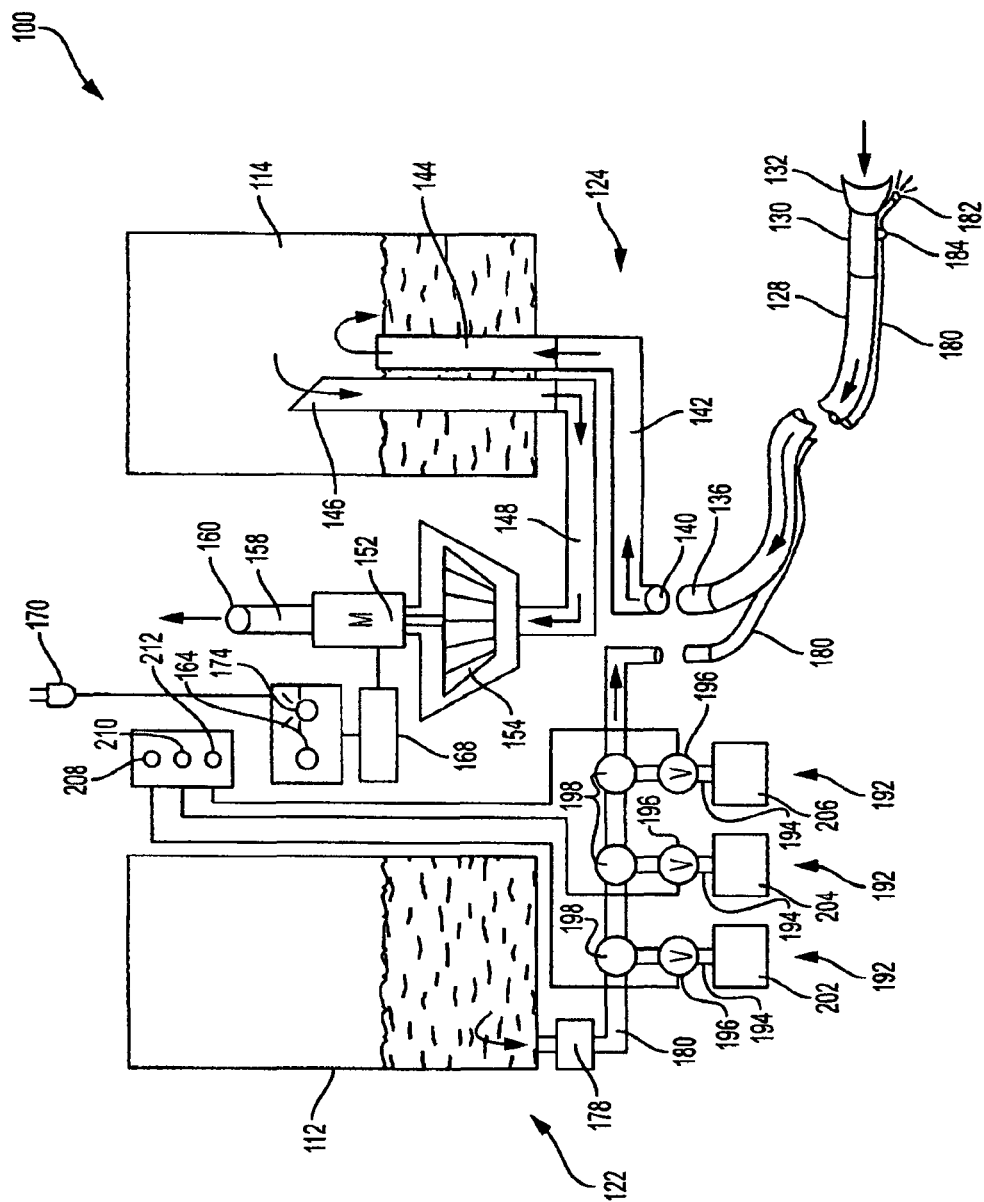
FIG. 2 is a schematic view of portions of the pet hydro washer of FIG. 1.
Figure 6:
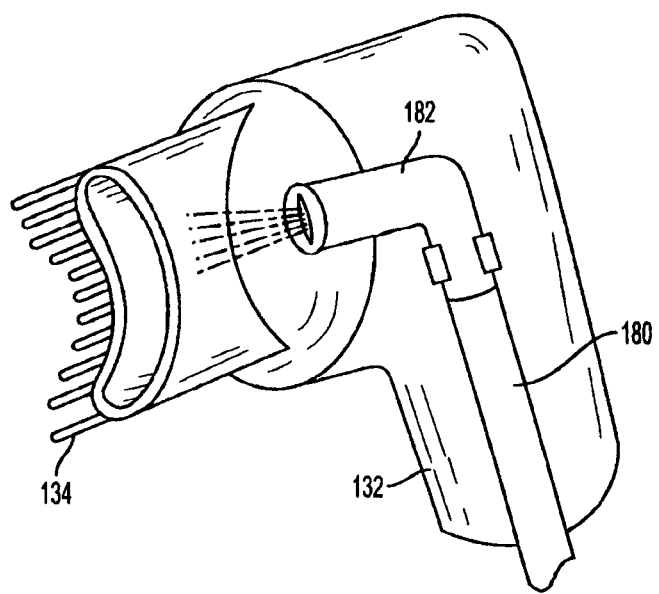
FIG. 6 is an illustrative attachment head for the suction hose of the pet hydro washer of FIG. 1.

FIG. 2 is a somewhat schematic view of portions of the pet hydro washer 100 of FIG. 1. The clean water storage tank 112 and the dirty water storage tank 114 are seen. The clean water storage tank 112 is part of a fluid delivery system 122 for storing a cleaning fluid (or clean aqueous solution) and delivering the cleaning fluid to the pet to be cleaned. The dirty water storage tank 114 is part of a liquid (or fluid) recovery system 124 for removing the cleaning liquid or fluid and debris from the pet to be cleaned and subsequently storing the recovered cleaning fluid and debris. The fluid recovery system 124 includes a flexible suction hose 128 having a fluid entry end in the form of a vacuum wand 130, terminating at various and interchangeable attachment heads 132. The attachment heads 132 may include combs or brushes (shown at 134 in FIG. 6) which untangle the pet's fur as it passes over the fur. The opposite end of the suction hose 128 includes a coupler end 136 configured to be removably received within a vacuum entrance port 140 in the central housing 110.

The vacuum entrance port 140 is coupled to an internal conduit 142 which is in turn removably coupled to a riser tube 144. The riser tube 144 extends vertically upwards into the dirty water storage tank 114. The dirty water storage tank 114 also has an air return conduit 146 which is removably coupled to a stationary air return conduit 148 within the central housing 110.

The stationary air return conduit 148 is in fluid communication with an airflow inducing motor 152, and specifically to an impeller 154 of the airflow inducing motor 152. Those of ordinary skill in the art will understand that the motor 152 has a shaft (not shown) which rotates rapidly in response to an electromagnetic field created within the motor 152, which in turn rotates the impeller 154 in order to create an airflow, or suction. The created airflow is exhausted from the central housing 110 through an exhaust conduit 158 which terminates at an exhaust port 160 having the same diameter as the vacuum entrance port 140.

Of interest, the flexible suction hose 128 may optionally be attached to the exhaust port 160 to enable air to be "blown" onto the pet, thereby serving as a "hair dryer." A heating element may further be attached to a distal end of the suction hose 128 to accelerate the drying process.

The airflow inducing motor 152 is controlled through an on/off switch 164 which is located on the central housing 110. The on/off switch 164 is electrically coupled to a processor 168 which controls the electric current entering the device through a conventional wall plug 170 which is used to electrically energize the motor 152 and other components described herein.

The processor 168 includes software or firmware that enables not only the energization of the motor 152 but also controls the energization through a teaching protocol which is initiated by the manual actuation of a teaching protocol switch 174.

Figure 3A:
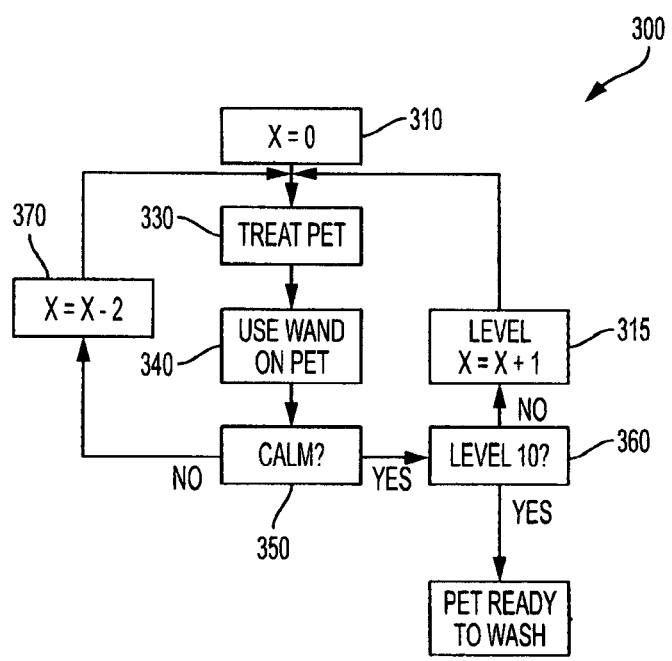
FIG. 3A is a flow chart showing an example training protocol for the pet hydro washer of FIG. 1. In this arrangement, the training protocol is automated according to a programmable logic controller.

FIG. 3A is a flow chart 300 showing the training protocol for the pet hydro washer 100 of FIG. 1. As shown in FIG. 3A, the teaching protocol initially sets the motor speed to the lowest setting possible upon actuation of the teaching protocol switch 174. This is shown at Box 310 as X=0.

The processor 168 then increases the speed of the motor 152 incrementally so that the animal becomes accustomed to the noise generated by the pet hydro washer 100, thereby reducing the anxiety associated with some animals hearing such mechanical noises.

According to FIG. 3A, the pet owner may begin treating the pet. This is shown at Box 330. Treating the pet may include activities needed to prepare the animal for cleaning using the pet hydro washer 100. Such activities may include providing a pet treat, providing comfort and providing a comfortable enclosed space. Such activities may also include filling the clean water storage tank 112 with warm water (or a warm water and surfactant solution). Such activities may also include selecting an appropriate attachment head 134 for the vacuum wand 130.

The pet owner may also use the wand 130 on the pet. This is shown at Box 340. Using the wand 130 means stroking the attachment head 134 across the fur of the pet while the motor 152 is running. This is done while the teaching protocol switch 174 is on in order to provide the incremental motor 152 speed function as further described below.

If the animal remains calm during treatment (as determined at Box 350) then the processor may incrementally increase motor speed. The processor first checks to see if level 10 has been reached. If the answer is no, the processor 168 automatically increases motor 152 speed. The increase in motor speed may be entirely automated. For example, a determination may be made at increments whether the animal is calm at step 350. If the answer is yes (and level 10 is not yet reached), then the processor incrementally increases motor speed. If the answer is no, the processor may incrementally decrease motor speed as seen at Box 370. It is of course understood that motor speed may not be reduced to a level below the lowest initial setting. Further if a determination is made that the animal is calm and that level 10 is achieved, then the pet owner proceeds with washing the pet as seen at Box 380.

The processor 168 may vary the current and therefore motor speed by any conventionally known manner, such as through pulse width modulation, a series of resistors, a variable autotransformer, or through a closed-loop speed feedback circuit.

As already described above, the acclimation process may be entirely automated, and determinations to increase or decrease motor speed may occur at intervals. Under this embodiment, a processor may be coupled to sensors that automatically determine physiological states of the animal. An automated inference may then be made if the animal is in fact in a calm or fearful state thereby triggering a corresponding increase or decrease in motor speed.

Note that under an embodiment, X=X+1 simply represents an incremental increase in motor speed. As one example, the processor may increase motor speed at very small intervals resulting in a smooth continuous escalation. Likewise, X=X−2 may under an embodiment simply represent an incremental decrease in motor speed. With respect to FIG. 3A, incremental increases and decreases in motor speed may occur at the same rate or rates that differ, i.e. greater or less than each other. Under an embodiment, the processor may simply toggle the motor between continuous escalation or reduction in motor speed depending on the state of the animal, i.e. calm or fearful.

Under one embodiment, determination to increase or decrease motor speed may depend upon physiological factors of the pet as measured by sensors placed on the pet such as heart and respiration monitors. On pet sensors may also include an accelerometer/gyroscope, a pressure sensitive band, an IR emitter/detector, etc. Under an embodiment, if heart rate and/or respiration levels rise, the motor speed level needs to be reduced to allow the dog to calm down. If heart rate and/or respiration levels remain low, the motor speed level can be increased until the motor is at full speed and grooming can begin.

Under one embodiment, determination to increase or decrease motor speed may depend upon physiological factors of the pet as measured by sensors external to the pet such as external heart and respiration monitors. Under an embodiment, a camera combined with special software may monitor respiration. Under an embodiment, the scatter caused by a directed RF signal (typically near the neck area) may reveal variations in the carotid artery. If heart rate and/or respiration levels rise, the motor speed level needs to be reduced to allow the dog to calm down. If heart rate and/or respiration level remain low, the motor speed level can be increased until the motor is at full speed and grooming can begin.

Under one embodiment, determination to increase or decrease motor speed may depend upon activity of the pet, as measured by sensors placed on the pet such as accelerometer, gyroscope, capacitive, or vibration sensors. If activity levels rise or remain high, the motor speed level needs to be reduced to allow the dog to calm down. If activity level is low, the motor speed level can be increased until the motor is at full speed and grooming can begin.

Under one embodiment, determination to increase or decrease motor speed may depend upon activity of the pet, as measured by sensors external to the pet such as passive infrared, reflected infrared, reflected radio-frequency, ultra-wideband reflection, capacitive sensors/devices, pressure-sensitive mat sensors, and automated visual detection. If activity level rises or remains high, the motor speed level needs to be reduced to allow the dog to calm down. If activity level is low, the motor speed level can be increased until the motor is at full speed and grooming can begin.

As already indicated above, processor 168 may incrementally increase the speed of a motor 152 by increasing delivery of power to the motor. Under one embodiment, the processor is configured to increase delivery of power by stepping up duty cycled voltage. Under one embodiment, the processor is configured to increase delivery of power by stepping up voltage levels. Under one embodiment, the processor is configured to increase delivery of power by stepping up electrical current.

Under another embodiment, a teaching protocol switch may be initiated by a user which begins an incremental increase in motor speed. The user is provided a pause button to pause training at a specific level if it noticed that the pet is becoming uncomfortable. Once pet stability is re-established, the pause button can be pressed to continue the training protocol.

Under another embodiment, a user may manually increase or decrease motor speed. The teaching protocol switch 174 may also include set motor speeds to enable a pet owner to manually select the desired motor speed and, thus, the vacuum strength. In this respect, a manual speed control device may be used as part of the pet hydro washer 100.

Figure 3B:
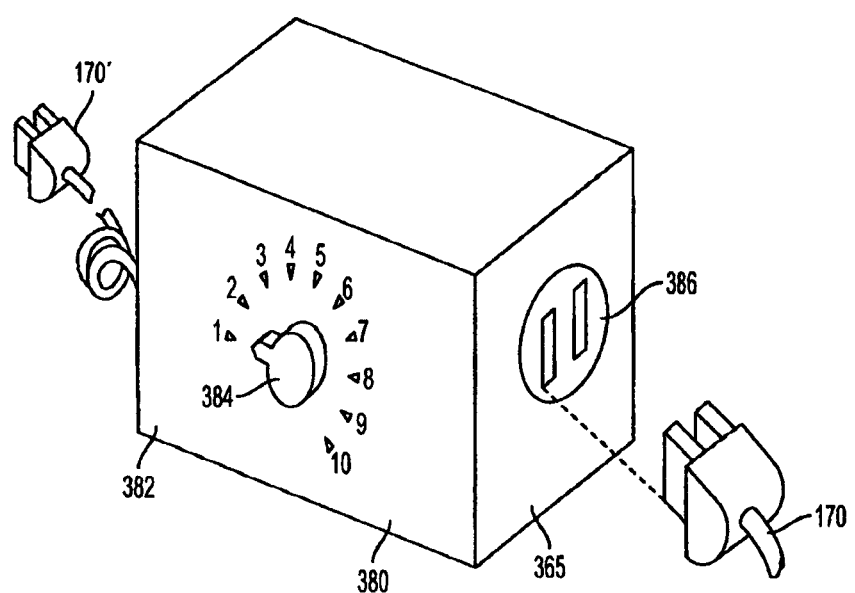
FIG. 3B is a schematic view of a manual speed control device. The manual speed control device allows the pet owner to override motor speed to accommodate the sensitivities of their pet.

FIG. 3B is a schematic view of a manual speed control device 380. The manual speed control device 380 allows the pet owner to override motor speed to accommodate the sensitivities or tolerance level of their pet. The device 380 is an electronic circuit in the nature of a rheostat that is used to control motor speed and, therefore, the noise generated by the motor 152 and associated impeller 154 and its suction by being electrically coupled to the manual speed control device 380.

It is noted that the noise created by suction (or rushing air) is generally proportional to the motor speed. As the motor speed is increased, the noise associated with motor operation and air movement proportionally increases. This noise equation is true of other noise producing electronic devices as well, including hair dryers, carpet cleaners, vacuum cleaners, and the like. Thus, the speed control device 380 may be used as a stand-alone item that can be used to manually and incrementally increase operating speed for any electronically energized household motorized device in order to slowly acclimate a pet to the noise. Alternatively, the speed control device 380 may be integral with the pet hydro washer 100 (or other electronic device).

According to the embodiment of FIG. 3B, the speed control device 380 has a housing 365. The housing 365 includes a front face 379 that supports a speed dial 384. The speed dial 384 is configured to be manually rotated to adjust an operating speed of a motorized electronic device (such as but not limited to) the pet hydro washer 100. In the illustrative arrangement of FIG. 3B, the dial 384 is moveable from level 1 incrementally or continuously up to level 10. This is consistent with the automatic embodiment of FIG.

3A wherein the processor 168 is used to automatically increase power level from level 1 up to level 10.

It is observed that the speed control device 380 may be designed to be placed in series with the power cord 170. In this way, the power cord 170 is plugged into an AC female electrical receptacle 378 associated with the housing 365 or with a pig tail (not shown) extending from the housing 365. In addition, the device 380 will have its own electrical power cord and male plug 170' extending from the housing 365 to enter a nearby conventional power receptacle, or socket.

Figure 3C:
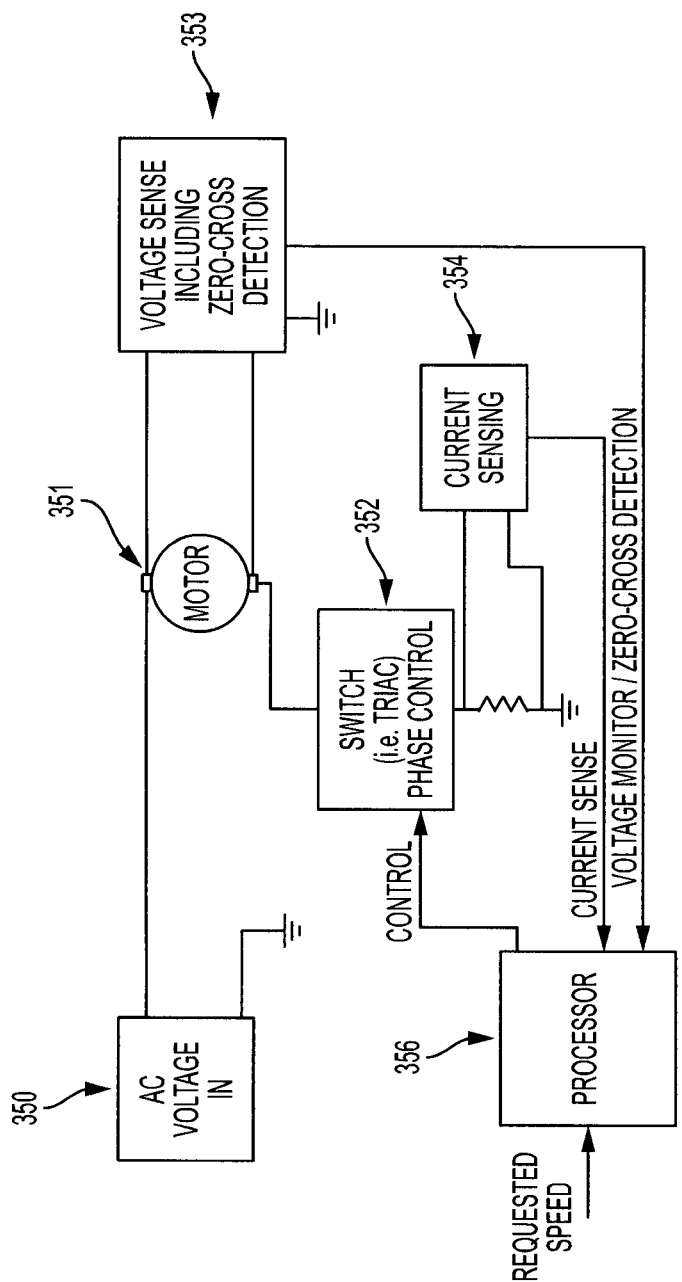
FIG. 3C is a block diagram of a motor speed control unit.

FIG. 3C is a block diagram of an example motor speed control circuit. An AC input 350 is shown providing electrical power to a motor 351 (which is the same motor shown in FIG. 2). The switch (i.e. triac) 352 functions as a phase controlled switch to provide variable power to the motor. The switch is synchronized to the zero-crossing of line power made available to the processor via the voltage sensor 353. Many known algorithms are available to control the speed of the motor via the phase control switch utilizing both motor voltage sensing and motor current sensing to estimate the motor speed. FIG. 3C shows current sensing 354. The processor 356 receives requested speed and controls switch 352 to provide variable power to the motor. The circuit is one technique for providing an incremental speed control of a motor, which in turn is used herein to desensitize a pet to the otherwise frightening noise of a motorized appliance.

Figure 3D:
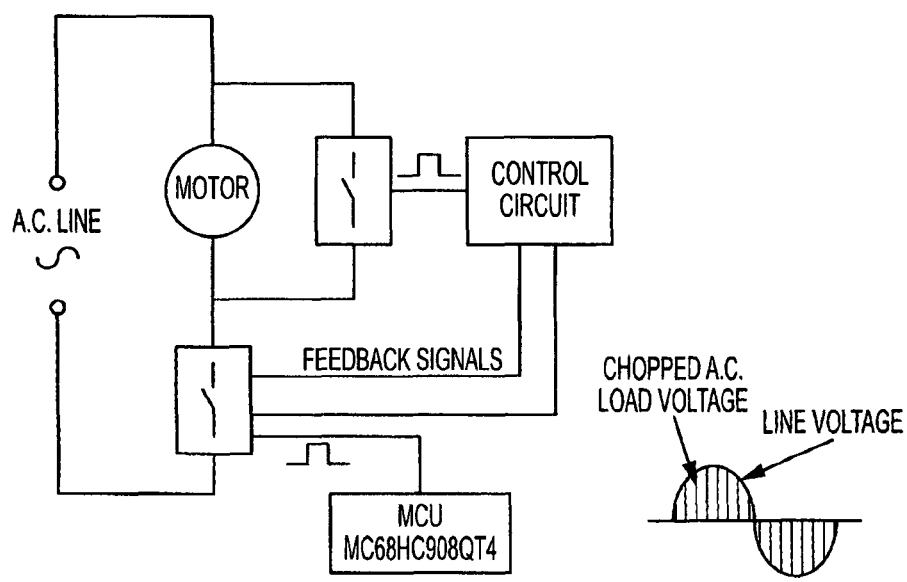
FIG. 3D is a circuit diagram of an illustrative control circuit for a microprocessor.

FIG. 3D is a circuit diagram of an illustrative control circuit for a microprocessor. The control circuit of FIG. 3D is configured to serve as a rheostat that allows manual step control of the electric current as fed to the motor 152. The circuit diagram shows a power input wherein voltage remains constant, but the current amperage is adjustable.

Through slow, incremental introduction of the pet offending sound, coupled with positive reinforcement and comfort through petting and, optionally, treats, or singing to the pet, or a combination thereof, a pet can be desensitized to the sound produced by a device. Thus, a pet can overcome the phobia associated with specific motor- and suction-associated noises. Ideally, the pet owner will also allow the pet to investigate the new product, both when it is fist brought into the home and when it is first being used around the pet.

It is acknowledged that the speed control device 380, when initially used to keep the pet hydro washer 100 (or other device) running at the lower speeds to acclimate the pet, may keep the device from fully operating according to its intended function. It is not the intention of the speed control device 380 to operate the product 100 as intended, but rather, to allow it to be used as a desensitizing tool in conjunction with appropriate training protocol.

Returning to FIGS. 1 and 2, the pet hydro washer 100 is designed to be used as a way of quickly washing the fur of a household pet without need of drawing a vat of water or spraying the animal with a freestanding hose. In operation, the clean water storage tank 112 of the pet hydro washer 100 is removably coupled to the central housing 110. In this way, the clean water storage tank 112 may be removed in order to fill the tank 112 with water or other cleaning fluid. The clean water storage tank 112 feeds water into a sump in fluid communication with a motorized liquid pump 178. A water delivery line 180 coupled to the liquid pump 178 extends from and is removably coupled to the central housing 110 through a waterline port 181 located adjacent to the suction hose 128. The water delivery line 180 is coupled to and runs along the length of the suction hose 128, terminating at a nozzle 182 adjacent the attachment end 132.

The ON/OFF switch 164 is manually actuated to energize the airflow-inducing motor 152, to create an airflow which forces air into the vacuum entrance port 140, which draws air into the attachment end 132 and through the suction hose 128. The flow of water through the water delivery line 180 may be controlled through an electrical water switch 184 which controls the actuation of the liquid pump 178. Alternatively, the liquid pump 178 may always be turned on and the water flow is controlled through a water valve which is manually or electronically closed when a water flow is no longer needed to wash the pet's fur.

The pet hydro washer 100 may also include accessory canisters 192. The canisters 192 are in fluid communication with the water delivery line 180 through feed lines 194. Control valves 196 are placed along the feed lines 194 for fluid flow control. In addition, a venturi-type coupler 198 is provided along the water delivery line 180. The accessory canisters 192 may include an odor remover canister 202 containing an odor-removing (or a deodorizing) liquid, a soap canister 204 containing a liquid soap or shampoo, and a conditioner canister 206 containing a fur conditioner. Alternatively, the conditioner canister 206 may hold a medicament.

The control valve 196 associated with the odor remover canister 202 is electrically or mechanically coupled to an odor remover switch 208. The odor remover switch 208 controls the actuation of the control valve 196 to cause the release or to halt the release of the odor removing liquid there through. The control valve 196 associated with the soap canister 204 is electrically or mechanically coupled to a soap switch 210. The soap switch 210 controls the actuation of the control valve 196 to cause the release or to halt the release of the liquid soap there through. The control valve 196 associated with the conditioner canister 206 is electrically or mechanically coupled to a conditioner switch 212. The conditioner switch 212 controls the actuation of the control valve 196 to cause the release or to halt the release of the liquid conditioner there through.

The liquid is removed from each canister 202, 204, 206 through a pressure drop created by the opening of the venturi type coupler 198 associated with the associated feed line 194. This is done through actuation of the associated switch 202, 204 or 206, as a venturi creates a low pressure zone in the water delivery line 180 which draws the liquid from the associated canister into the delivery line 180.

The pet hydro washer 100 may be packaged into a box or container for shipping and retail sales. In one aspect, the retail packaging or shipping container may be partially disassembled by the pet owner or care taker to create a noise reducing barrier 220. This aspect is shown in FIGS. 4 and 5.

Figure 4:
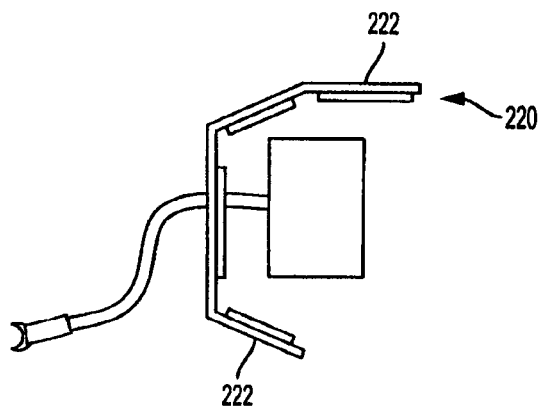
FIG. 4 is a top view of the pet hydro washer of FIG. 1. Here, the pet hydro washer is shown in conjunction with a sound barrier.
Figure 5:
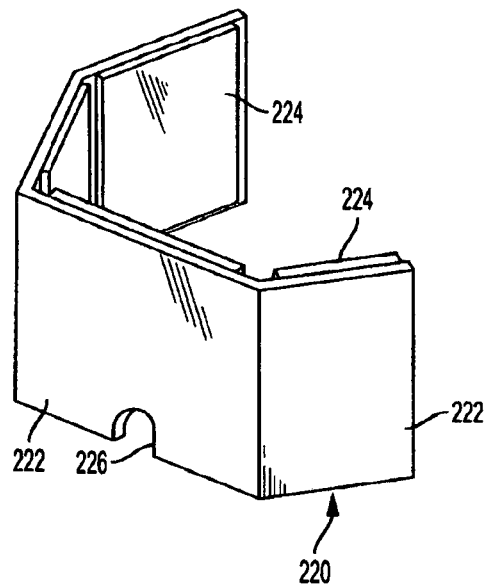
FIG. 5 is a perspective view of the sound barrier portion shown in FIG. 4.

FIG. 4 is a top view of the pet hydro washer 100 of FIG. 1. Here, the pet hydro washer 100 is shown in conjunction with a noise reducing barrier 220. FIG. 5 is a perspective view of the noise reducing barrier 220 alone. The noise reducing barrier 220 includes a series of articulated wall portions 222. Each wall portion has a noise insulating panel 224, such as a foam panel or is fabricated from an insulative material. In operation, the barrier 220 is placed about the hydro washer 100 to restrict noise from the device 100 from reaching the pet, thereby reducing anxiety for the animal. The barrier 220 may include a bottom opening 226 through which the suction hose 128 and coupled water delivery line 180 extends.

In use, the coupler end 136 of the suction hose 128 is mounted within the vacuum entrance port 140 of the central housing 110. At the same time, the water delivery line 180 is coupled to the waterline port 181. The electrical plug 170 is plugged into a conventional AC outlet or, alternatively, and internal DC battery may supply the necessary current.

The barrier 220 is then set up about, or partially about, the pet hydro washer 100 with the suction hose 128 and waterline 180 passing through the bottom opening 226 of the barrier 220.

The ON/OFF switch 164 is manually actuated so that an electrical current is passed to the processor 168 and motor 152 and switch 174 to move to either the teaching protocol or to one of the preselected motor speeds. The energization of the motor 152 causes the turning of impeller 154, thereby creating an airflow sequentially through internal air return conduit 148, the air return conduit 146, the dirty water tank 114, the riser tube 144, the internal conduit 142, the vacuum entrance port 140, the vacuum coupler end 136, suction hose 128, vacuum wand 130, and finally attachment end 132. The impeller 154 exhausts the air through the exhaust conduit 158 where it is expelled through exhaust port 160. In short, a suction airflow is created through the pet hydro washer 110.

If the animal is not used to or is anxious about the operation of an electric motor, the operator may actuate the teaching protocol by placing the teaching protocol switch 174 at the teaching protocol location. The actuation of the teaching protocol switch 174 causes the processor 168 to run through a sequence of motor operations, described above in connection with FIG. 3. Here, the speed of the motor 152 is incrementally increased so that the animal becomes accustomed to the noise created by the pet hydro washer 100.

When water or a combination of water and odor remover, soap, or conditioner is desired to be used upon the animal's fur, the water switch 184 is manually actuated to energize the liquid pump 178. The energization of the liquid pump 178 causes water contained within clean liquid storage tank 112 to be withdrawn and passed through waterline port 181 and water delivery line 180 so that it is expelled through nozzle 182.

Additional liquids may be entrained into the water flowing through water delivery line 180 through actuation of either the odor remover switch 208, the soap switch 210 or the conditioner switch 212. The actuation of one of these switches 208, 210, 212 causes the corresponding control valve 196 to open, thereby causing the selected liquid to pass through its corresponding venturi system coupler 198 from either the odor remover canister 202, the soap canister 204, or the conditioner canister 206. Thus, water and/or an additional liquid is expelled through the nozzle 182 and onto the animal's fur.

The dirty water and/or water and additional liquid is vacuumed off of the animal's fur by running the attachment end 132 over the fur, wherein the suction pulls the dirty water from the fur, through the wand 130, through the suction hose 128, and internal conduit 142, and through the riser tube 144 where the dirty water is gravitationally disposed within the dirty water tank 114 and separated from the airstream or air flow.

The air separated from the dirty water exits the dirty water tank 114 by flowing into the air return conduit 146 and stationary air return conduit 148, where it is exhausted to ambient air through exhaust port 160. At the same, the dirty water contained within the dirty water tank 114 may be discarded by simply removing the water tank from the central housing 110 and opening a control valve or cap associated with the dirty water tank.

If desired, the coupler end 136 of the suction hose 128 may be coupled to the exhaust port 160 to provide an outflowing airflow from the suction hose 128. This airflow may be utilized to blow dry the animal's fur.

Variations of the pet hydro washer and the method of teaching a pet to be washed may fall within the spirit of the claims, below. For example, the pet hydro wash 100 may be part of a system, or kit, that not only includes the attachment head 134 seen in FIG. 6, but other types of attachment heads. The kit may include combs, brushes, massage heads and other implements as attachment heads, depending on the size of the animal and the thickness of the fur. It will be appreciated that the inventions are susceptible to modification, variation and change without departing from the spirit thereof.

Figure 7:
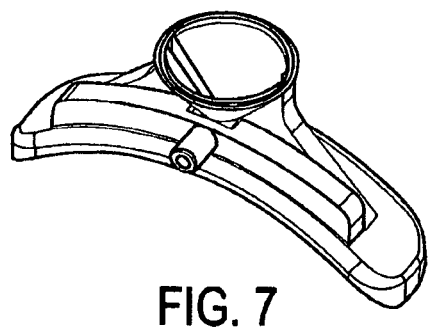
FIG. 7 shows a contoured end sub-assembly, under an embodiment.

The attachment end as seen in FIG. 2 may differ in shapes and size. FIG. 7 shows a contoured end sub-assembly with fluid tube omitted.

Figure 8:
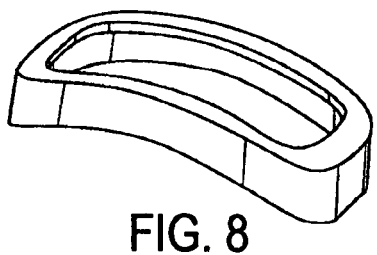
FIG. 8 provides an example of an external gasket, under an embodiment.

FIG. 8 provides an example of an external gasket (placed around the outside of an attachment end).

Figure 9:
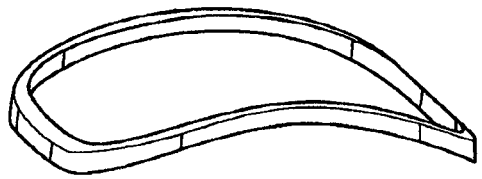
FIG. 9 shows an example of internal gaskets, under an embodiment.
Figure 10:
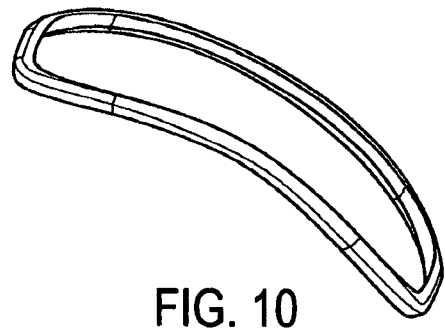
FIG. 10 shows an example of internal gaskets, under an embodiment.

FIGS. 9 and 10 show examples of internal gaskets (placed around the inside of an attachment end).

Figure 11:
FIG. 11 shows an example of an "off the shelf" extruded gasket, under an embodiment.

FIG. 11 shows an example of an "off the shelf" extruded gasket (placed into a gland around the inside of an attachment end).

Figure 12:
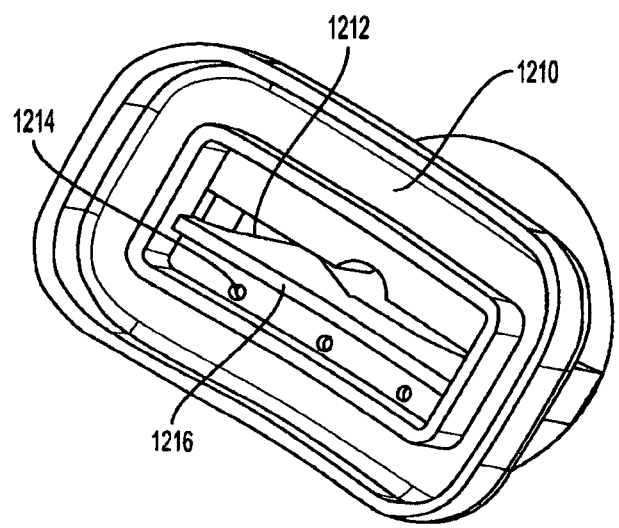
FIG. 12 illustrates a bottom view of a contoured head with gasket removed, under an embodiment.

FIG. 12 illustrates a bottom view of a contoured end with gasket removed. FIG. 12 shows a gasket area 1210. FIG. 12 shows an air and fluid inlet 1212 (comprising a large rectangular area). FIG. 12 shows fluid outlets 1214 with wall (divider) 1216 separating suction and outlets.

Figure 13:
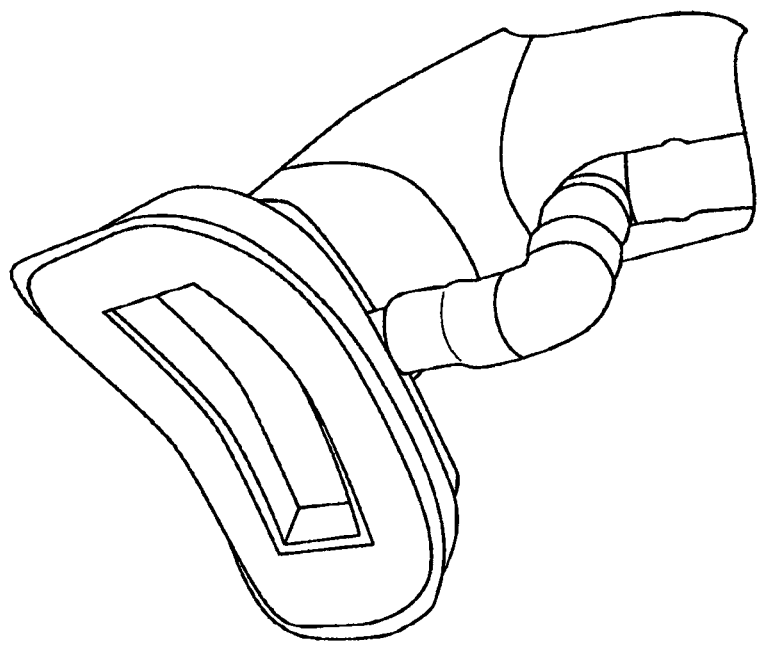
FIG. 13 shows an example of an attachment end, under an embodiment.
Figure 14:
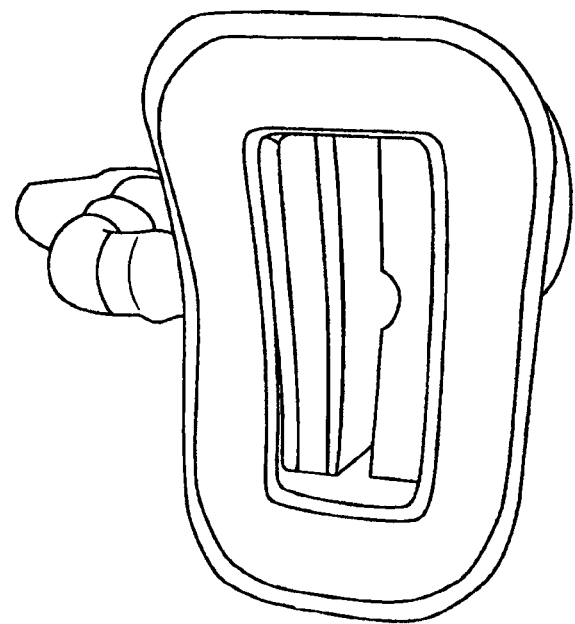
FIG. 14 shows an example of an attachment end, under an embodiment.
Figure 15:
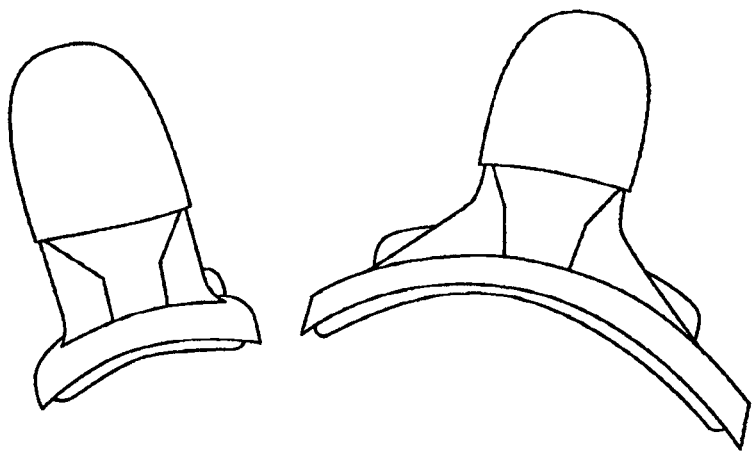
FIG. 15 shows an example of an attachment end, under an embodiment.

FIGS. 13-15 shows various examples of an attachment end under an embodiment.

A pet hydro washer is described that comprises a central housing containing a motor and an air inflow impeller. The pet hydro washer of an embodiment comprises a fluid delivery system having a clean liquid storage tank, and a water delivery line in fluid communication with the clean liquid storage tank terminating at a nozzle. The pet hydro washer of an embodiment comprises a fluid recovery system having a liquid recovery tank in fluid communication with the air inflow impeller through a first air conduit, and a suction hose in fluid communication with the liquid recovery tank. The pet hydro washer of an embodiment comprises the motor configured to generate rotational movement in the air inflow impeller. The pet hydro washer of an embodiment comprises a processor configured to control delivery of power to the motor, the controlling delivery of power including incrementally changing a level of power delivered to the motor. The pet hydro washer of an embodiment comprises at least one attachment head configured to wash fur of an animal through movement of the at least one attachment head across the animal's fur while the air inflow impeller is operating, wherein the at least one attachment head is configured to be removably attached to a distal end of the suction hose.

The fluid delivery system of an embodiment further comprises at least one accessory liquid canister, and a control valve in fluid communication with the at least one accessory liquid canister and in fluid communication with the water delivery line.

The at least one accessory liquid canister of an embodiment comprises an odor remover canister, a soap canister, and a conditioner canister or a medicament canister.

The control valve of an embodiment comprises a control valve associated with each of the odor remover canister, the soap canister, the conditioner canister, or medicament canister, with each valve controlling fluid flow from its associated canister to the water delivery line.

The fluid delivery system of an embodiment further comprises a switch electrically coupled to the control valve for electronically actuating the control valve upon actuation of the electrical switch; and wherein the water delivery line is clipped to the suction hose so that the nozzle is proximate the distal end of the suction hose.

The fluid delivery system of an embodiment further comprises a venturi coupler along the water delivery line in fluid communication with the liquid storage tank, a liquid pump in fluid communication with the liquid storage tank, and a controller which controls the flow of liquid expelled through the nozzle.

A sound insulating barrier of an embodiment is configured to at least partially surround the fluid delivery system and the fluid recovery system.

The sound insulating barrier of an embodiment is configured to be at least a portion of retail packaging for the pet hydro washer.

The generating rotational movement in the air inflow impeller creates under an embodiment negative pressure in the suction hose.

The controlling delivery of power includes under an embodiment incrementally changing the level of power delivered to the motor in response to detecting a physiological state of the animal.

The physiological state comprises under an embodiment a first state and a second state.

The detecting the physiological state includes under an embodiment using at least one of an accelerometer, gyroscope, pressure sensitive band, capacitive sensor, IR emitter/detector, and vibration sensor to detect the physiological state.

The detecting the physiological state includes under an embodiment using at least one of a passive infrared sensor, a reflected infrared sensor, a reflected radio-frequency sensor, an ultra-wideband reflection sensor, and a pressure-sensitive mat to detect the physiological state.

The first state comprises at least one of an elevated heart rate and an elevated respiration level, under an embodiment.

The first state comprises elevated activity levels, under an embodiment.

The second state comprises at least one of a normal heart rate and a normal respiration level, under an embodiment.

The second state comprises normal activity levels, under an embodiment.

The incrementally changing the level of power delivered to the motor includes under an embodiment incrementally increasing the level of power delivered to the motor from a first level in response to detecting the first state.

The incrementally changing a level of power delivered to the motor includes under an embodiment incrementally decreasing the level of power delivered to the motor in response to detecting the second state.

The at least one attachment head comprises under an embodiment an opening for removal of fluid through the fluid recovery system.

Gasket material is attached to an outer periphery of the opening, under an embodiment.

The gasket material comprises low friction material, under an embodiment.

The outer periphery approximately defines a curved planar surface, under an embodiment.

The curved planar surface is concave, under an embodiment.

A manual motor speed control unit comprises under an embodiment a housing, and a speed dial along a front of the housing, wherein the speed control unit is configured to control the delivery of power to the motor by allowing an operator to incrementally increase the delivery of power to the motor from a low level up through at least five higher levels incrementally, thereby slowly acclimating a pet to sounds associated with the airflow inducing motor and airflow.

A method for teaching an animal to be washed is described comprising the steps of providing a pet washing device having a liquid delivery system to deliver a stream of washing liquid to the fur of a household pet, and a liquid recovery system for removing the washing liquid from the animal's fur and for collecting the liquid, the liquid recovery system having a motor for inducing rotational movement in an air inflow impeller, and a processor for controlling electrical actuation of the motor, actuating the motor at a slow speed to produce a least amount of sound while adjacent the animal to be washed, incrementally increasing the speed of the airflow inducing motor to increase the sound of the airflow inducing motor over time in steps and in response to detecting a physiological condition of the animal using one or more physiological sensors, and applying liquid to the animal to be washed through the liquid delivery system while simultaneously removing the liquid from the animal through the liquid recovery system, thereby washing the animal.

The fluid delivery system of an embodiment comprises a clean liquid storage tank, and a water delivery line in fluid communication with the clean liquid storage tank and terminating at a nozzle.

The fluid recovery system of an embodiment comprises a liquid recovery tank in fluid communication with the motor through a first air conduit, and a suction hose in fluid communication with the liquid recovery tank.

The pet washing device of an embodiment further comprises a central housing containing the motor and the air inflow impeller, and at least one attachment head configured to wash an animal's fur through movement of the attachment head across the animal's fur, and wherein the at least one attachment head is configured to be removably attached to a distal end of the suction hose.

The method of an embodiment provides accessory canisters to provide additional liquids into the washing liquid of the liquid delivery system, and entrains the additional liquid within the accessory canister into the washing liquid.

The method of an embodiment provides the at least one attachment head to the suction hose, and treats the animal's fur while passing the at least one attachment head over the animal's fur while removing the liquid with the liquid recovery system.

The pet washing device of an embodiment further comprises at least one accessory liquid canister; and a control valve in fluid communication with the at least one accessory liquid canister and in fluid communication with the water delivery line.

The at least one accessory liquid canister comprises under an embodiment an odor remover canister, a soap canister, and a conditioner canister or a medicament canister.

The control valve of an embodiment comprises a control valve associated with each of the odor remover canister, the soap canister, and the conditioner canister or medicament canister, with each valve controlling fluid flow from its associated canister to the water delivery line.

The fluid delivery system of an embodiment further comprises a venturi coupler along the water delivery line in fluid communication with the liquid storage tank, a liquid pump in fluid communication with the liquid storage tank, and a controller which controls the flow of liquid expelled through the nozzle.

A pet hydro washer is described that includes a central housing containing a motor and an air inflow impeller, a fluid delivery system having a clean liquid storage tank, and a water delivery line in fluid communication with the clean liquid storage tank terminating at a nozzle, a fluid recovery system having a liquid recovery tank in fluid communication with the air inflow impeller through a first air conduit, and a suction hose in fluid communication with the liquid recovery tank, the motor configured to generate rotational movement in the air inflow impeller, a processor configured to control delivery of power to the motor in response to detecting a physiological state of an animal, and at least one attachment head configured to wash fur of the animal through movement of the at least one attachment head across the animal's fur while the air inflow impeller is operating, wherein the at least one attachment head is configured to be removably attached to a distal end of the suction hose.

A pet hydro washer is first provided herein. In one embodiment, the pet hydro washer first comprises a central housing. The central housing holds mechanical equipment including a motor and an airflow impeller. The motor and impeller work with a suction hose that extends external from the central housing in order to serve as a vacuum.

The pet hydro washer further comprises a fluid delivery system and a fluid recovery system. Each of the fluid delivery system and the fluid recovery system is coupled to the central housing.

The fluid delivery system includes a clean liquid storage tank. The clean liquid storage tank is used to hold clean water, or a clean aqueous solution that includes a surfactant. The aqueous solution is used for washing the fur of a pet. The clean liquid storage tank is coupled to a liquid pump. The liquid pump passes clean aqueous fluids from the liquid storage tank to a water delivery line. The water delivery line extends along the vacuum hose in order to deliver water to the fur of a pet. The water delivery line terminates at a spray nozzle.

The fluid delivery system may also include one or more accessory canisters in fluid communication with the water delivery line. Feed lines are provided from each of the canisters, with each feed line preferably having control valves in order to selectively deliver additional fluid to the aqueous solution in the water delivery line. Such fluids may include a soap, a conditioner, a medicament or a fragrance. In one aspect, the manual actuation of a control switch opens a corresponding control valve which allows the passage of liquids contained within a selected accessory canister to flow into the water delivery line and to thereby be entrained into the clean water passing there through.

The fluid recovery system includes a dirty water storage tank. The dirty water storage tank receives water that has been delivered to the pet's fur by the water delivery line, and recovered through the suction hose through internal conduits. The suction hose terminates at a vacuum wand with a selection of attachment heads configured to brush or comb an animal's fur. The suction hose and water delivery line are coupled together for ease of operation. An airflow is created through the suction hose by the motorized impeller coupled to the internal conduits. The motorized impeller is controlled through a processor or circuitry which is operated through an ON/OFF switch as well as a motor speed/teaching protocol switch.

The pet hydro washer includes at least one, and preferably various, attachment heads. The attachment heads are positioned closely adjacent to or can attach with the spray nozzle of the water delivery line. The attachment heads comprise brushes, combs, massage heads, and combinations thereof. The attachment heads may be of varying sizes and configurations to facilitate the cleaning of pets of various sizes and breeds with various fur lengths.

The pet hydro washer may also include a noise reducing barrier. In one aspect, the noise reducing barrier comprises a plurality of insulated panels that are formed from the retail packaging and/or a shipping container of the pet hydro washer. The noise reducing barrier has a bottom opening which allows the passage of the suction hose and the water delivery line together through the barrier. The washer may also include a blow dryer, which is obtained by attaching a hose of the washer to an exhaust port, or by reversing the motor of the washer and, thus, the flow of air. In one aspect, the hose may include a heating element to accelerate the drying process.

A method of teaching an animal to be washed is also provided. The method includes the processor ramping up or increasing the speed of the motorized impeller over a short amount of time while close to the animal. The incremental increasing of the motor speed allows the animal to be acclimated to the sound or noise produced by the motorized impeller over time, thereby reducing the anxiety of the animal. The processor may be incorporated into the washer itself or into a separate and distinct device into which the washer or other motorized device is electrically coupled.

We claim:

1. A pet hydro washer, comprising:
a central housing containing a motor and an air inflow impeller;
a fluid delivery system having a clean liquid storage tank, and a water delivery line in fluid communication with the clean liquid storage tank terminating at a nozzle;
a fluid recovery system having a liquid recovery tank in fluid communication with the air inflow impeller through a first air conduit, and a suction hose in fluid communication with the liquid recovery tank;
the motor configured to generate rotational movement in the air inflow impeller;
a processor configured to control delivery of power to the motor, the controlling delivery of power including incrementally changing a level of power delivered to the motor; and
at least one attachment head configured to wash fur of an animal through movement of the at least one attachment head across the animal's fur while the air inflow impeller is operating, wherein the at least one attachment head is configured to be removably attached to a distal end of the suction hose.

2. The pet hydro washer of claim 1, wherein the fluid delivery system further comprises:
at least one accessory liquid canister;
a control valve in fluid communication with the at least one accessory liquid canister and in fluid communication with the water delivery line.

3. The pet hydro washer of claim 2, wherein:
the at least one accessory liquid canister comprises an odor remover canister, a soap canister, and a conditioner canister or a medicament canister; and
the control valve comprises a control valve associated with each of the odor remover canister, the soap canister, the conditioner canister, or medicament canister, with each valve controlling fluid flow from its associated canister to the water delivery line.

4. The pet hydro washer of claim 2, wherein the fluid delivery system further comprises:
a switch electrically coupled to the control valve for electronically actuating the control valve upon actuation of the electrical switch; and wherein the water delivery line is clipped to the suction hose so that the nozzle is proximate the distal end of the suction hose.

5. The pet hydro washer of claim 2, wherein the fluid delivery system further comprises:
a venturi coupler along the water delivery line in fluid communication with the liquid storage tank;
a liquid pump in fluid communication with the liquid storage tank; and
a controller which controls the flow of liquid expelled through the nozzle.

6. The pet hydro washer of claim 1, further comprising:
a sound insulating barrier configured to at least partially surround the fluid delivery system and the fluid recovery system.

7. The pet hydro washer of claim 6, wherein the sound insulating barrier is configured to be at least a portion of retail packaging for the pet hydro washer.

8. The pet hydro washer of claim 1, the generating rotational movement in the air inflow impeller creating negative pressure in the suction hose.

9. The pet hydro washer of claim 1, the controlling delivery of power including incrementally changing the level of power delivered to the motor in response to detecting a physiological state of the animal.

10. The pet hydro washer of claim 9, wherein the physiological state comprises a first state and a second state.

11. The pet hydro washer of claim 10, the detecting the physiological state including using at least one of an accelerometer, gyroscope, pressure sensitive band, capacitive sensor, IR emitter/detector, and vibration sensor to detect the physiological state.

12. The pet hydro washer of claim 10, the detecting the physiological state including using at least one of a passive infrared sensor, a reflected infrared sensor, a reflected radio-frequency sensor, an ultra-wideband reflection sensor, and a pressure-sensitive mat to detect the physiological state.

13. The pet hydro washer of claim 10, wherein the first state comprises at least one of an elevated heart rate and an elevated respiration level.

14. The pet hydro washer of claim 10, wherein the first state comprises elevated activity levels.

15. The pet hydro washer of claim 10, wherein the second state comprises at least one of a normal heart rate and a normal respiration level.

16. The pet hydro washer of claim 10, wherein the second state comprises normal activity levels.

17. The pet hydro washer of claim 10, wherein:
the incrementally changing the level of power delivered to the motor includes incrementally increasing the level of power delivered to the motor from a first level in response to detecting the first state.

18. The pet hydro washer of claim 10, wherein: the incrementally changing a level of power delivered to the motor includes incrementally decreasing the level of power delivered to the motor in response to detecting the second state.

19. The pet hydro washer of claim 1, wherein the at least one attachment head comprises an opening for removal of fluid through the fluid recovery system.

20. The pet hydro washer of claim 19, wherein gasket material is attached to an outer periphery of the opening.

21. The pet hydro washer of claim 20, wherein the gasket material comprises low friction material.

22. The pet hydro washer of claim 20, wherein the outer periphery approximately defines a curved planar surface.

23. The pet hydro washer of claim 20, wherein the curved planar surface is concave.

24. The pet hydro washer of claim 1, further comprising:
a manual motor speed control unit comprising a housing, and a speed dial along a front of the housing, wherein the speed control unit is configured to control the delivery of power to the motor by allowing an operator to incrementally increase the delivery of power to the motor from a low level up through at least five higher levels incrementally, thereby slowly acclimating a pet to sounds associated with the airflow inducing motor and airflow.

25. A pet hydro washer, comprising:
a central housing containing a motor and an air inflow impeller;
a fluid delivery system having a clean liquid storage tank, and a water delivery line in fluid communication with the clean liquid storage tank terminating at a nozzle;
a fluid recovery system having a liquid recovery tank in fluid communication with the air inflow impeller through a first air conduit, and a suction hose in fluid communication with the liquid recovery tank;
the motor configured to generate rotational movement in the air inflow impeller; a processor configured to control delivery of power to the motor in response to detecting a physiological state of an animal; and
at least one attachment head configured to wash fur of the animal through movement of the at least one attachment head across the animal's fur while the air inflow impeller is operating, wherein the at least one attachment head is configured to be removably attached to a distal end of the suction hose.

\* \* \* \* \*